(12) United States Patent
Lucero

(10) Patent No.: US 6,522,800 B2
(45) Date of Patent: Feb. 18, 2003

(54) MICROSTRUCTURE SWITCHES

(76) Inventor: Bernardo F. Lucero, 405 El Camino Real, #530, Menlo Park, CA (US) 94025-5340

(*) Notice: Subject to any disclaimer, the term of this patent is extended or adjusted under 35 U.S.C. 154(b) by 53 days.

(21) Appl. No.: 09/745,977

(22) Filed: Dec. 21, 2000

(65) Prior Publication Data

US 2002/0191889 A1 Dec. 19, 2002

(51) Int. Cl.[7] .................................................. G02B 6/42
(52) U.S. Cl. .............................. 385/16; 385/15; 385/17; 385/18
(58) Field of Search .............................. 385/15, 16, 17, 385/18, 20, 21, 22, 23, 25, 37

(56) References Cited

U.S. PATENT DOCUMENTS

| 4,317,011 | A | * | 2/1982 | Mazurk | 385/15 X |
| 4,480,182 | A | * | 10/1984 | Ely et al. | 385/15 X |
| 5,278,925 | A | * | 1/1994 | Boysel et al. | 385/14 |
| 5,774,252 | A | * | 6/1998 | Lin et al. | 359/224 |
| 5,867,302 | A | * | 2/1999 | Fleming | 359/291 |

* cited by examiner

Primary Examiner—Brian Healy
(74) Attorney, Agent, or Firm—Larry B. Guernsey; Intellectual Property Law Offices

(57) ABSTRACT

A microstructure switch (10, 50) having a main body (13), a moveable switching element (17), one or more membranes (26, 52) which connect the moveable switching element (17) to the main body (13) and an actuator (30) which moves the moveable switching element (17) from a first position (72) to at least one activated position (74). The membranes may be either or both of a primary membrane (26) or a secondary membrane (52). A primary membrane (26) may be used as a temporary membrane (32) which serves to position the moveable switching element (17) until it is permanently positioned by a secondary membrane (52), or by an actuator (30). At this point the temporary membrane (32) is removed. Also an optical system (100) which uses various directing components (76) in conjunction with a microstructure switch (10, 50) to direct signals (92) to various channels (86). Also a switching array (200) which includes a number of microstructure switches (10, 50) which use various directing components (76) in conjunction with a microstructure switch (10, 50) to direct signals (92) to various channels (86).

75 Claims, 13 Drawing Sheets

MICROSTRUCTURE SWITCHES

TECHNICAL FIELD

The present invention relates generally to micro-switches used in signal routing, and more particularly to direction and character of optical signals.

BACKGROUND ART

Signal processing is a very important part of modern technology. It is used in a wide variety of fields, such as in high-speed printing, image processing and telecommunications. Optical signals especially have become very important in recent years, since light travels at maximum speed and may not be vulnerable to interference problems that trouble electrical signals. As the definition of a composite signal increases by adding more pixels per inch, etc., it becomes necessary for signal processing equipment to handle larger and larger numbers of discrete signals in a smaller and smaller area. Equipment that switches the optical signals in these discrete channels must thus also be reduced further and further in size, a trend which has lead to the development of arrays of micro-switches.

These micro-switches can be made in a number of ways. A first type of switch uses electro-optically active material which can change its index of refraction or polarity when an electric field is applied. This type of switch can be effective, but may require the use of expensive materials, and generally require relatively high activation voltages.

Micro-machined devices of silicon (MEMS) is another approach to the fabrication of micro-switches. As the name implies, a wafer of silicon is machined by any number of processes including micro-sawing, etching, etc. to create a switching element which is free to move in some direction, either linearly or rotationally so that a signal can be directed from a first signal path into a second signal path as required. An actuator device is generally needed to move the switching element, and a problem has existed in getting each of these switching elements in an array which may include hundreds or thousands to go to precisely the same position when activated, and to return to the same position when deactivated. Since the spatial location of each incoming and outgoing beam must be precisely defined, if the switching element is not also precise in its positioning in both the activated and deactivated states, signal information may be distorted or lost.

Prior art switches include cantilever shafts which allow a switch element to be raised and lowered in and out of a beam path. These are less versatile and reliable than would be desired. It would be preferred to use switches in which the switching elements are free-standing, that is, completely unattached to the surrounding matrix material, however, these are difficult to produce and precise orientation of each of a great number of microscopic elements can be difficult to achieve.

Accordingly, there is a need for a micro-switch which can be made individually very small, and for which large multiples can be manufactured in large arrays. There is also a need for micro-switches which require only small activation voltages, are reliable, cost effective, and assume very precise positions both when activated and deactivated.

DISCLOSURE OF INVENTION

Accordingly, it is an object of the present invention to provide micro-switches which can be made very small.

Another object of the invention is to provide micro-switches which can be grouped in very large arrays.

And another object of the invention is to provide micro-switches which require only small activation voltages.

A further object of the invention is to provide micro-switches which can be very precisely positioned when in either the activated or deactivated state.

An additional object of the present invention is to provide a method of manufacture which employs the use of membranes, either primary or secondary or both, to aid in positioning the switching element or retain its position during fabrication operations.

Briefly, one preferred embodiment of the present invention is a microstructure switch having a main body, a moveable switching element, one or more membranes which connect the moveable switching element to the main body and an actuator which moves the moveable switching element from a first position to a second position. The membranes may be either or both of a primary membrane or a secondary membrane. A primary membrane may be used as a temporary membrane which serves to position the moveable switching element until it is permanently positioned by a secondary membrane, or by an actuator. At this point the temporary membrane is removed.

An advantage of the present invention is that it is very cost effective to manufacture.

Another advantage of the invention is switching elements can be made completely free-standing, but the use of a membrane as a temporary positioning device makes fabrication operations much easier.

And another advantage of the invention is low activation voltages can be used, thus allowing cheaper and less expensive power supplies to be used.

A yet further advantage of the present invention is that an actuator mechanism can be included in a secondary membrane to make an integrated mechanism.

An additional advantage is the integration of components and elements other than switch elements onto the platform through subassembly.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
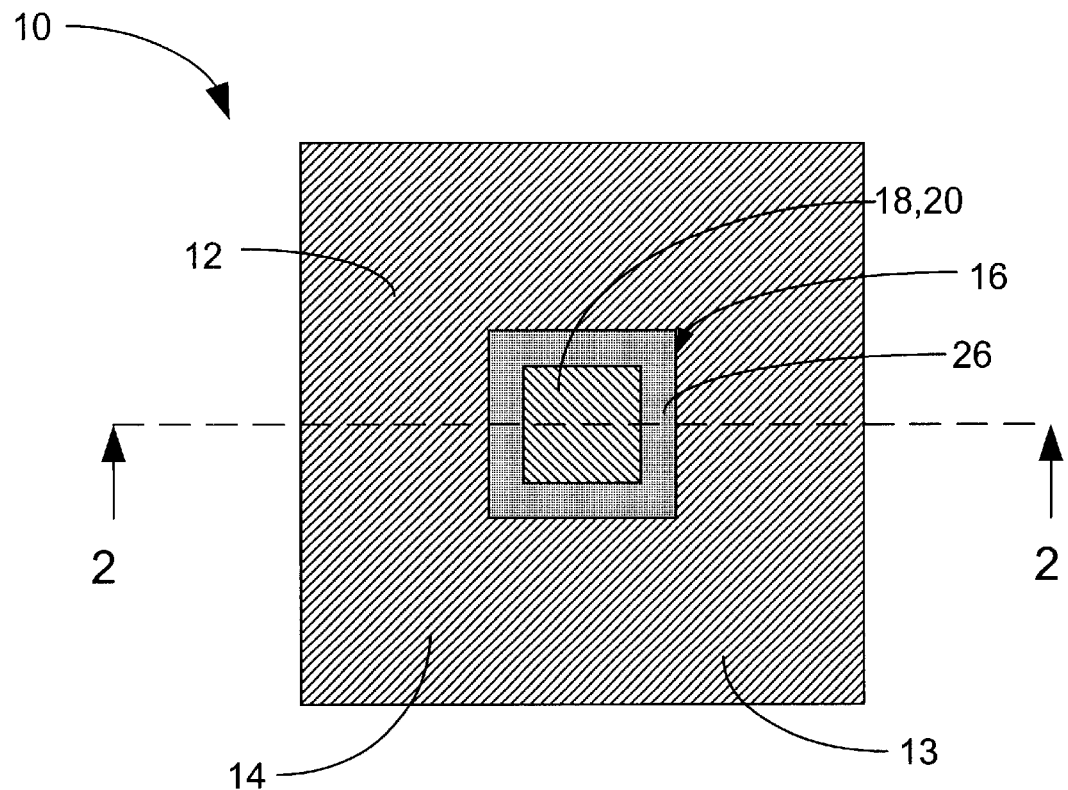
FIG. 1 shows a top plan view of a micro-switch of the present invention.

A first preferred embodiment of the present invention is a microstructure switch, which includes a multidirectional movable shaft that is made from and functions as an integrated component of a silicon micro-machined device, commonly known as MEMS. As illustrated in the various drawings herein, and particularly in the view of FIG. 1, a form of this first preferred embodiment of the inventive device is depicted by the general reference character 10. A second alternative to the design is to fabricate a shaft that is not free standing and moves only in limited directions, as will be discussed below. Fabrication methods for both embodiments are similar with the exception of the application of a membrane, as will be discussed below.

Figure 2:
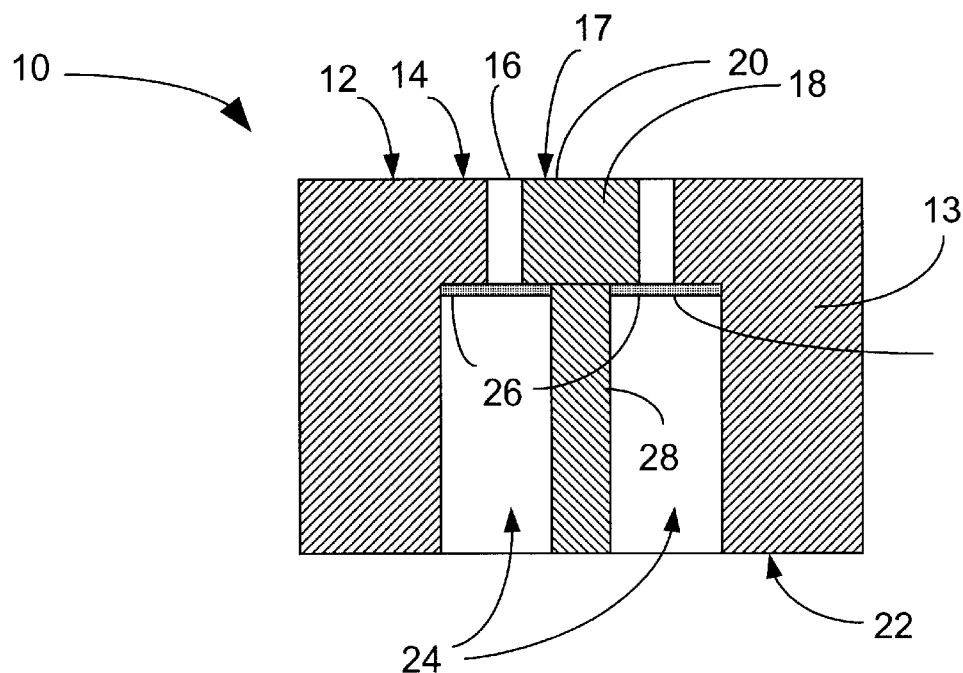
FIG. 2 illustrates a side cut-away view of a micro-switch as taken through line 2—2 of FIG. 1.
Figure 3:
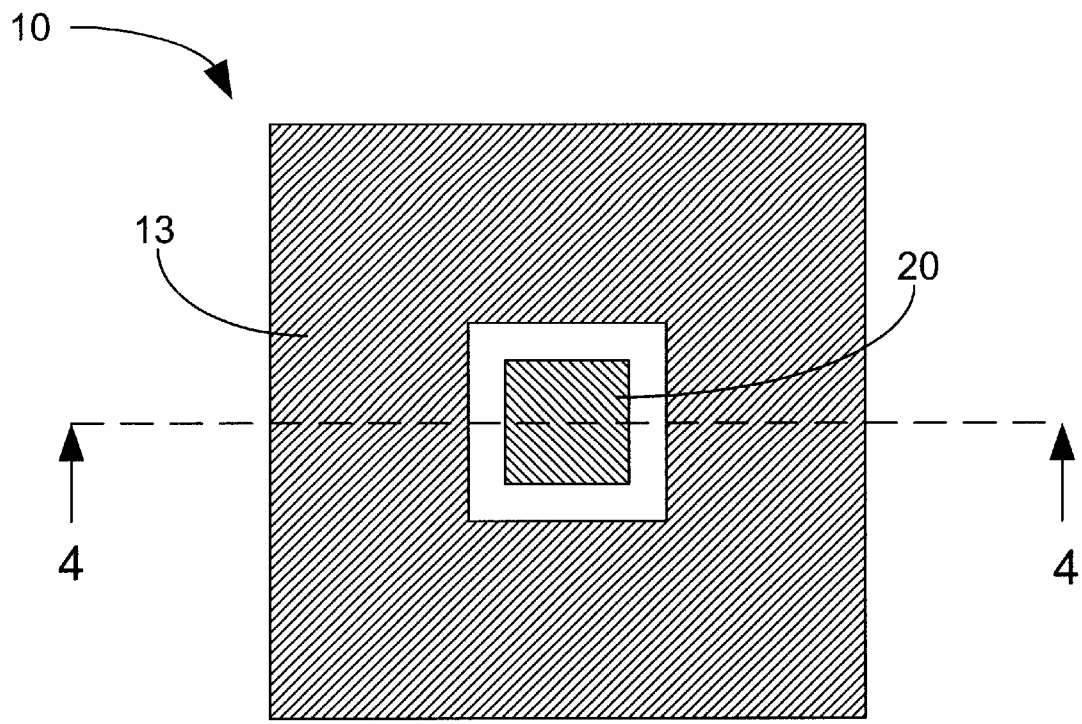
FIG. 3 shows a top plan view of micro-switch of the present invention in which the primary membrane has been removed.
Figure 4:
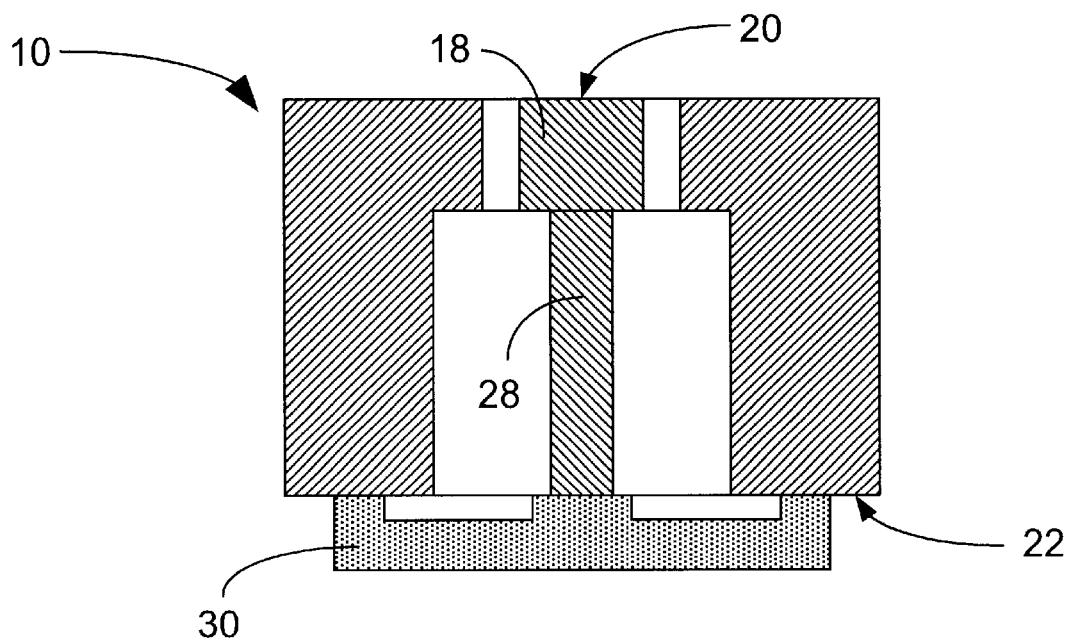
FIG. 4 illustrates a side cut-away view of a micro-switch as taken through line 4—4 of FIG. 3.

The first embodiment of the microstructure switch 10, which is capable of multidirectional movement, is illustrated in its most basic form in FIGS. 1–4. FIGS. 1 and 2 show the switch in an intermediate stage of fabrication, FIGS. 3 and 4 in a more finished stage. FIG. 2 is a cross-sectional view of FIG. 1 as taken through line 2—2, and FIG. 4 is similarly a view taken through line 4—4 of FIG. 3.

The switch 10 includes a wafer substrate 12, having a main body portion 13 and top surface 14, which has been etched to provide a top surface groove 16, as best seen in FIG. 2. This top-surface groove 16 surrounds shaft 18, which includes a platform 20, upon which various optical and signal path direction devices may be positioned or formed. The bottom surface 22 of the wafer 12 is then etched to form a bottom-surface groove 24. This preferably does not cut completely through to connect with the top-surface groove 16, but stops while a thin membrane which will be termed the primary membrane 26, remains. The primary membrane 26 is created for the purpose of holding the shaft 18 in a precise position during the fabrication of the device, for maintaining position during the attachment of the actuator 30, and for ease of attaching or fabricating a device on to the platform 20.

The bottom-surface groove 24 surrounds a second shaft portion, which will be referred to as the shank 28. The shank 28 maintains attachment with the shaft 18, and may, as shown in the figure be of smaller diameter than the shaft 18, or may be continuous in diameter or even larger, as will be obvious to one skilled in the art. Similarly, the bottom-surface cutaway 24 is shown here to be of larger diameter than the top-surface groove 16, but this should not be construed as a limitation, as the relative diameters of the grooves 16, 24 may also vary. The entire moveable portion of the switch 10, including the shaft 18, shank 28, platform 20 and any optical elements or directing components (discussed below) which are formed from the shaft material, or added to the platform 20, will be referred to collectively as a moveable switching element 17.

In FIGS. 3 and 4, the shaft 18 is freed completely from the main body of the wafer substrate 12 by the release of the primary membrane 26, which can be broken by abrupt movement of the shaft 18, or otherwise disrupted. The shaft 18 is still held in position by the actuator 30 which is attached to the bottom surface 22 of the wafer substrate 12 and the shaft 18, and serves to position the shaft 18 and also provides the movement mechanism for raising and lowering or rotating the platform 20. The actuator 30 can be any number of conventional mechanisms. For example, vertical movement of the platform 20 could be implemented using a piezoelectric device, horizontal movement could be actuated using a screw shaft, and rotating or oscillating could be controlled by a rotary type actuator.

Figure 5:
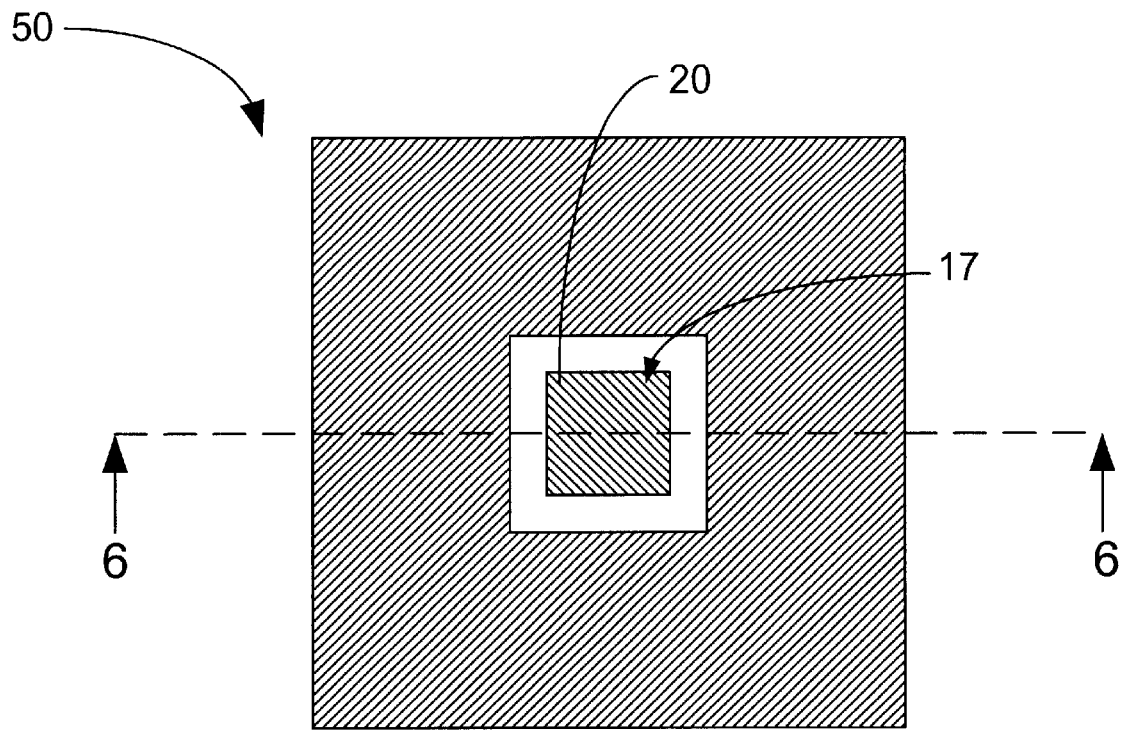
FIG. 5 shows a top plan view of a second embodiment of a micro-switch of the present invention.
Figure 6:
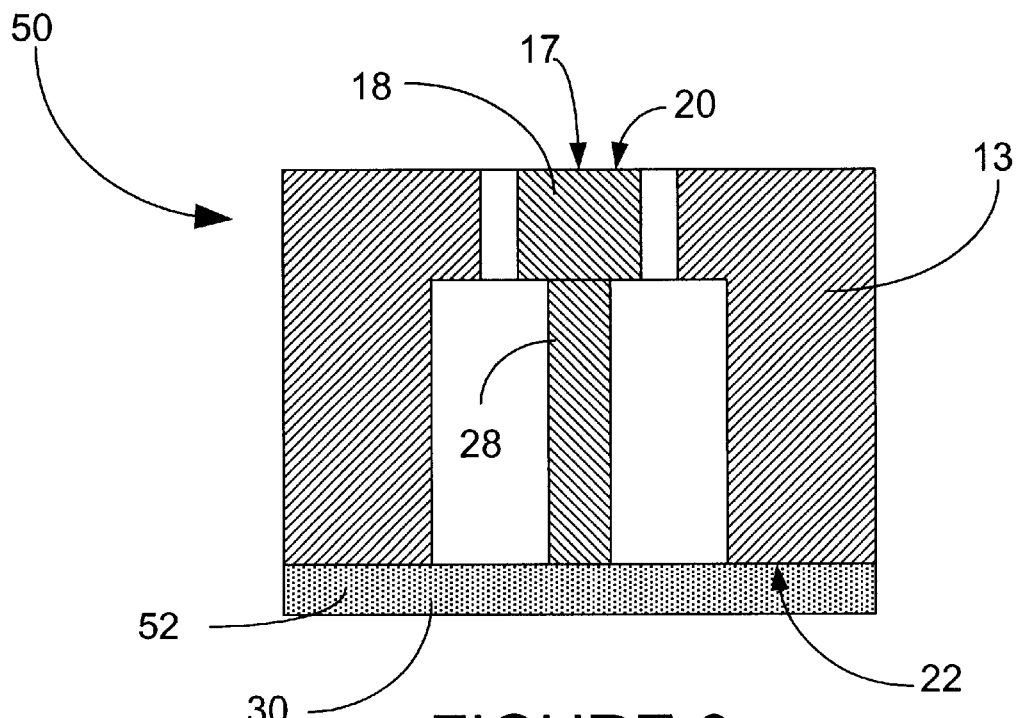
FIG. 6 illustrates a side cut-away view of second embodiment of a micro-switch as taken through line 6—6 of FIG. 5.

As a variation, a second embodiment 50 is presented in FIGS. 5 and 6, FIG. 6 being a cross-sectional view of FIG. 5 as taken through line 6—6. Where elements correspond to those in the first embodiment, the same element numbers will be used.

In this embodiment 50, there is a secondary membrane 52, which includes an actuator 30. Attachment has been made to the bottom side of the wafer 22 and then the primary membrane 26 is released from the shaft 18 and main body 13 using a chemical or mechanical process. The secondary membrane 52 has two primary functions, 1) precise and repeatable placement of the shaft 18 and platform through the various ranges of movement and 2) to integrate an electrostatic, electromagnetic or other type of actuator 30 thus making a monolithic device. Also, the secondary membrane 52 may be pre-processed or pre-fabricated with patterns or devices prior to the attachment to the main structure 13. The advantages are having a device that operates with greater relative precision and repeatability and which is able to easily integrate other types of MEMS actuation methods.

It should be understood that although the primary and secondary membranes 26, 52 are shown as being continuous on all sides of the shaft 18, this is not necessary, and in fact either membrane 26, 52 could take the form of one or more tabs which join to the shaft 18 or shank 28 on only one or more sides, and not around the entire perimeter of the shaft 18 or shank 28.

Figure 7:
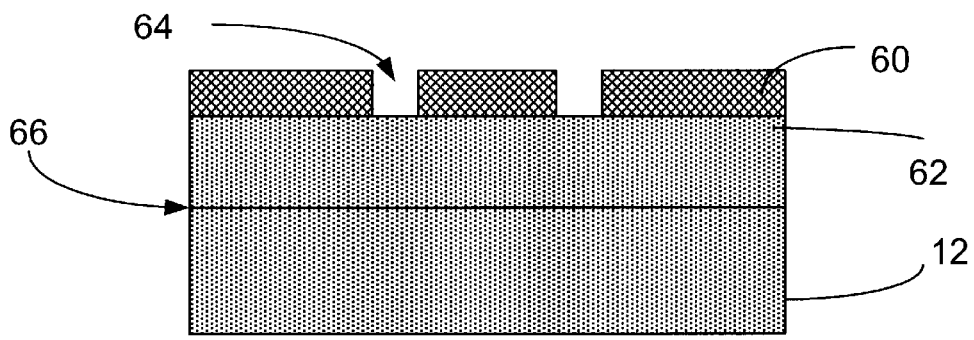
FIG. 7 shows a side cut-away view of the first stage in the fabrication of a micro-switch of the present invention.

FIGS. 7–13 illustrate the series of steps involved in fabricating the micro-switch 10. FIG. 7 shows the wafer substrate 12 to which a mask layer 60 and a second wafer layer 62 have been added. An etch-stop layer 66 has been added to the wafer substrate 12 before the addition of the second wafer layer 62. This etch-stop layer 66 may be an oxide or passivation layer and its purpose is to limit the depth of etching from both the top and bottom surfaces. Alternately, it is possible to use a silicon-on-insulator wafer (SOI wafer), which is prefabricated with an etch-stop included.

Figure 8:
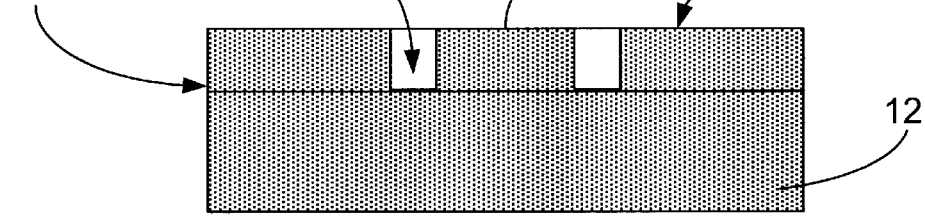
FIG. 8 illustrates a side cut-away view of the second stage in the fabrication of a micro switch of the present invention.

In the mask 60, open areas 64 allow the passage of etching chemicals or reactive ion bombardment in the conventional manner of wafer etching. FIG. 8 shows the result of this etching operation, as the top surface groove 16 is completed, to form the platform 20.

Figure 9:
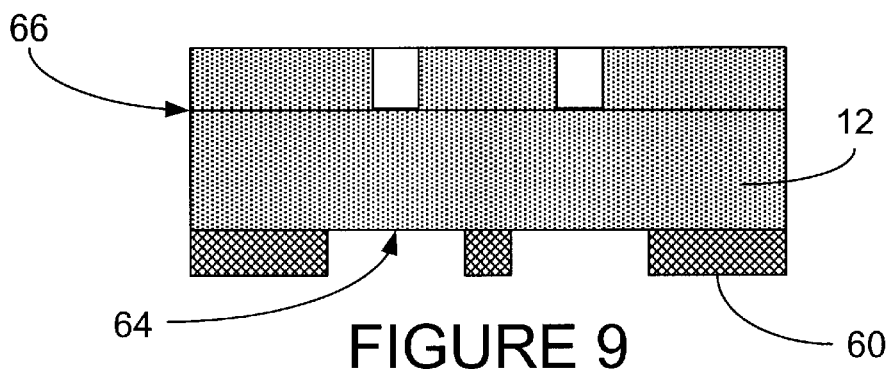
FIG. 9 shows a side cut-away view of the third stage in the fabrication of a micro-switch of the present invention.
Figure 10:
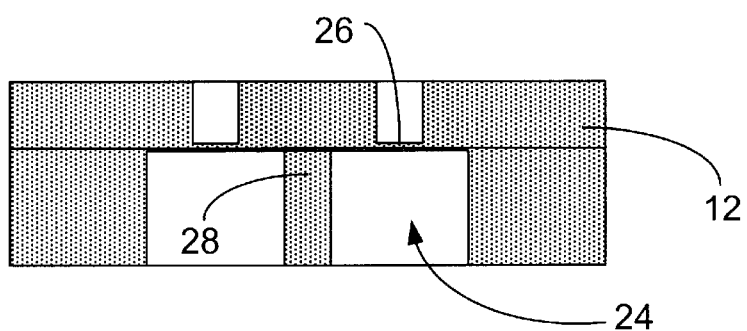
FIG. 10 illustrates a side cut-away view of the fourth stage in the fabrication of a micro-switch of the present invention.

FIGS. 9 and 10 show a repetition of this process on the bottom side 22 of the wafer 12, as the bottom surface groove 24 is created around the shank 28. The depth of the bottom surface groove 24 is precisely controlled to leave a remaining primary membrane 26 of a thickness preferably on the order of 1–12 $\mu$m. This primary membrane 26 will ultimately be removed, but it acts to maintain the platform 20 and shank 28 in correct position during the remainder of the fabrication. If the platform 20 and shank 28 were to be detached entirely so that they are completely free-standing, maintaining them in the proper position, especially across an array of hundreds or thousands would be difficult.

Thus the primary membrane 26, and shaft 18 are made at the same time by etching a trench around the shaft 18 location, first from one side stopping at the etch stop layer 66 and then complete the membrane 26 by etching from the second side to the etch stop 66. As referred to above, the barrier is formed by either doping silicon or by thin film deposition or by time etch or using SOI (silicon-on-insulator) wafer as the start material. Placement of the membrane 26 can be on or near the surface of the silicon wafer 12, either on top or on bottom or located deep within the silicon close to or at the center of the wafer.

Figure 11:
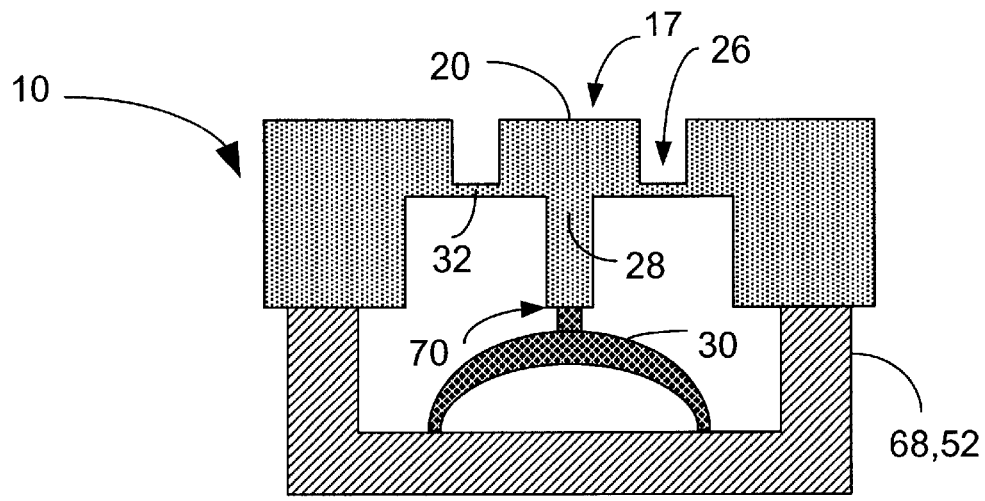
FIG. 11 shows a side cut-away view of the fifth stage in the fabrication of a micro-switch of the present invention.

FIG. 11 shows the actuator 30 attached to the bottom of the shank 28. The actuator 30 is seated upon a base 68, which could also be a secondary membrane 52, as discussed above.

Figure 12:
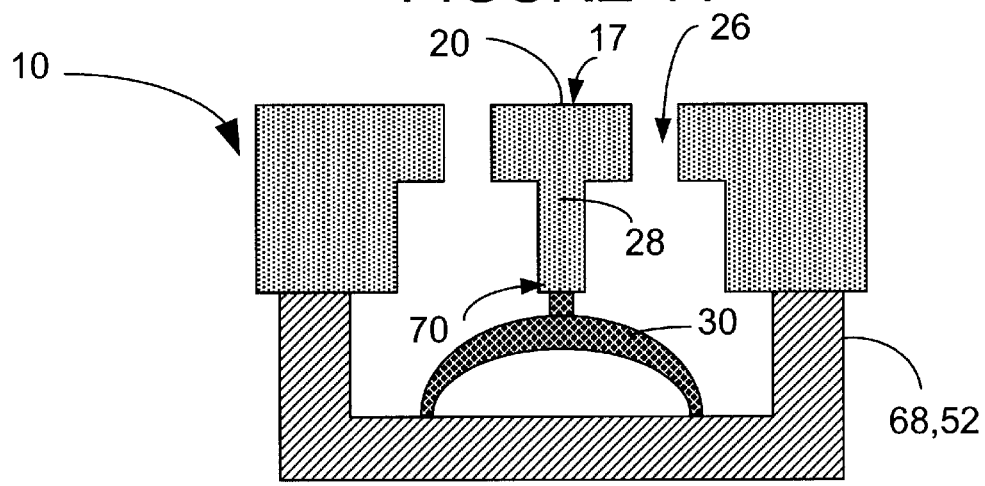
FIG. 12 illustrates a side cut-away view of the sixth stage in the fabrication of a micro-switch of the present invention.

When the actuator has been attached to the shank 28, it can now serve to maintain the moveable switching element 17 in proper position and orientation, so the primary membrane 26 can now be broken or removed as seen in FIG. 12, so that the membrane is actually a temporary membrane 32.

Figure 13:
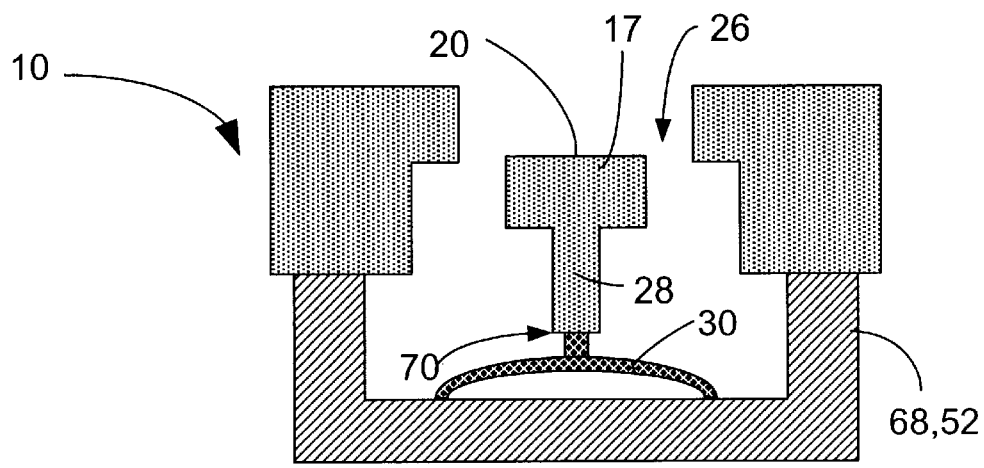
FIG. 13 shows a side cut-away view of the seventh stage in the fabrication of a micro-switch of the present invention.

In the case illustrated, the actuator 30 serves to move the moveable switching element 17 vertically, rather than acting to rotate it. Thus, FIG. 13 shows the actuator 30 in an active state, and drawn downward, presumably out of a beam path, thus switching a beam from its former direction.

As mentioned above, the temporary primary membrane 32 may be removed once the device is fabricated and fully assembled. The method of removal is either by chemical or mechanically process to achieve complete separation of the shaft from the membrane and core material. The result is a shaft 18 that is independent (free standing) of the main structure 13 and is capable of moving in many directions.

Optionally, the membrane 26 is kept intact and is an integral component to the overall device 10. It functions to hold the shaft 18 in a precise position and it also serves to return the shaft 18 back to its original position. This design does limit movement to an arc or vertical direction and displacement is controlled by the pattern and size of the membrane 26. Varying the area, the thickness, the shape and/or pattern (perforation of various geometric design) of the membrane 26 affects its range of displacement and amount of flex force necessary for the actuator 30 to provide.

The actuation attachment point 70 is that area where the bonding to an actuator takes place. There are various methods for the attachment of the actuator 30 to the shank 28 and main structure 13, for example, the use of adhesive, soldering and other mechanical means. The actuator 30 could be in an array pattern or individual components that are aligned to the bottom side of the wafers or device and attached to the main body 13 and shank 28. Another approach is to attach a thin substrate like silicon, metal, glass or plastic material to the bottom side 22 of wafer 12 and fabricate an actuator 30 directly onto the secondary membrane 52. The type and design of the actuator 30 will determine the range of motion, speed and the directions that the device will be positioned. Generally, a displacement range of 100 μm is anticipated. Types of actuators include piezoelectric, electromagnetic, hydraulic, electrostatic and others.

The range of displacement of the shaft 18 is controlled by the actuator 30 or secondary membrane 52. It is possible to combine two or more directional movements in a single unit, for example, vertical movement with rotation.

The platform 20 will house any structure or directing component 76 that alters the signal, for example: mirrors, prisms, lens, electrodes and contact points, as well as, other passive devices and active devices (lasers or detectors). Although some components such as collimators, polarizers, gratings, filters, resonators and diffractive optical elements actually alter the character of the signal, rather than actually directing it, however, for the purpose of this application, the term "directing component 76" will be used to include these components as well.

Devices such as mirrors and prisms can be fabricated out of the wafer material 12 using surface and bulk micromachining techniques. Other devices such as lasers, detectors and lenses can be mechanically attached to the platform. To achieve integration and build scalable planar structures, wafers can be pre-fabricated with devices and structures such as waveguides, V-grooves, optical platforms, electrodes, light source and detectors, active and passive components etc. The shape and size of the platform 20 is determined by the application of the device being fabricated or attached onto the platform 20. Optical applications where a device has been pre-fabricated can be modified using planar processing to make a moving shaft with a planar device on the platform. For example, a waveguide can be modified with a moving mirror or prism that is capable of altering the direction of the signal.

The microstructure switches 10, 50 can be used in a number of applications. Due to their small size, they are expected to be used in arrays having a large number of individual switches 10, all of which have been fabricated from a common wafer 12. They are expected to be incorporated into larger optical systems 100, of which many variations are shown in the following FIGS. 14–37.

Figure 14:
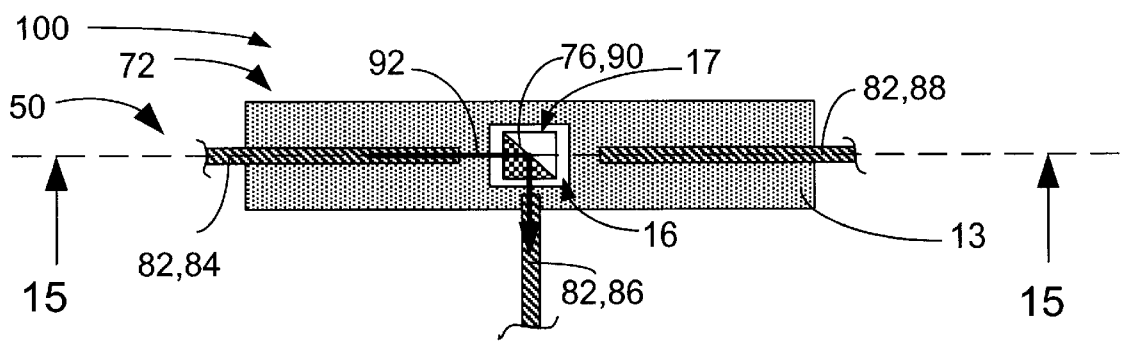
FIG. 14 illustrates a top plan view of an optical system using a mirror, the micro-switch being in home position.
Figure 15:
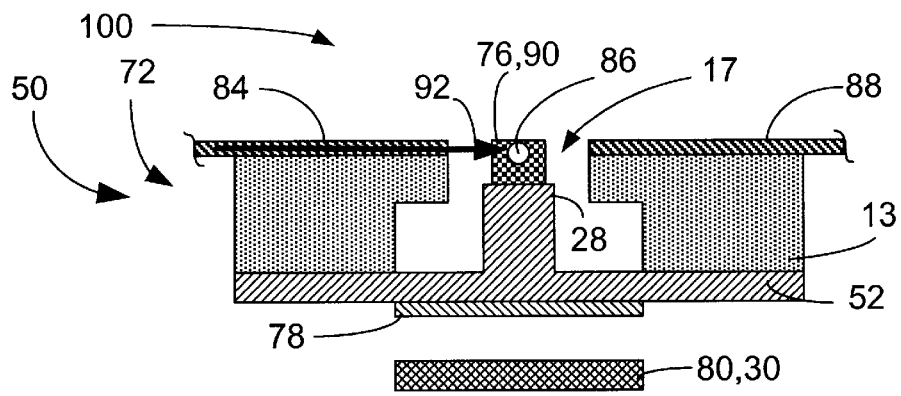
FIG. 15 shows a side cut-away view of an optical system using a mirror, the micro-switch being in home position, the view being taken through line 15—15 of FIG. 14.

One key use of the present invention is for the fiber optic industry. Such an implementation of an optical system 100 is shown in FIGS. 14–17. FIG. 14 is a top plan view of the second embodiment of a switching element 50 having a main body 13 from which a movable switching element 17 has been fashioned. FIG. 15 is a side cut-away view showing that the shank 28 is attached to secondary membrane 52 to which a magnetic material layer 78 or coating has also been attached. An electromagnet 80 is used as an actuator 30. The switch 50 is shown in its home position 72. The switch is used with a number of channeling devices 82 which could be wave-guides or fiber optics segments, etc. A first device 82 acts as an input source 84, and two others act as a first output channel 86 and a second output channel 88. A directing component 76, which in this case is a flat surface mirror 90, is in the path of the input light beam 92 and reflects it into the first output channel 86. Thus, with the switch in home position 72, first output channel 86 is active and second output channel 88 is inactive.

Figure 16:
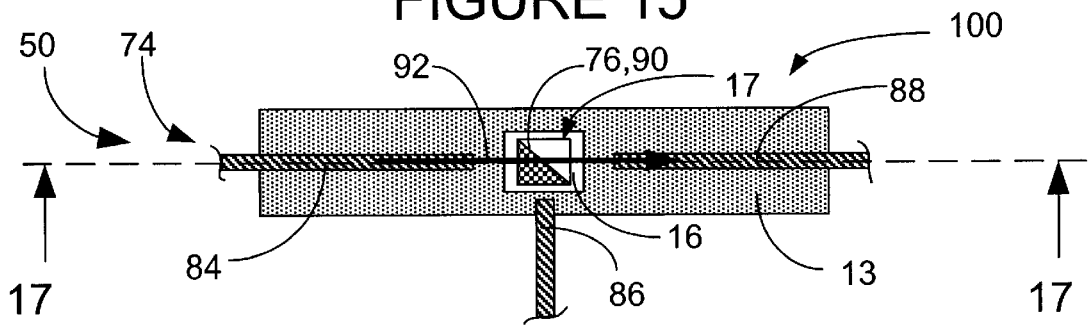
FIG. 16 illustrates a top plan view of an optical system using a mirror, the micro-switch being in activated position.
Figure 17:
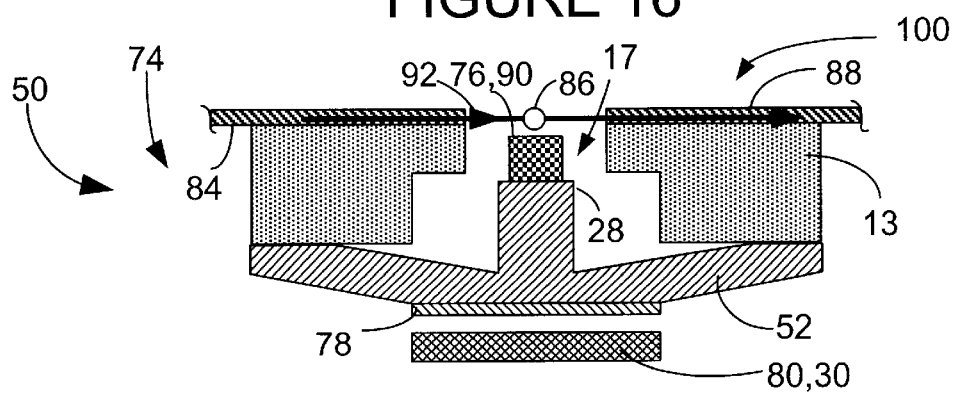
FIG. 17 shows a side cut-away view of an optical system using a mirror, the micro-switch being in activated position, the view being taken through line 17—17 of FIG. 16.

FIGS. 16 and 17 show the switch 50 in activated position 74. The electromagnet 80 actuator 30 has been activated, which draws the magnetic material layer 78 downwards to the extent allowed by the secondary membrane 52. The moveable switching element 17 is thus also drawn downwards so that the mirror 90 is no longer in the path of the input light beam 92, so that it now travels on to the second output channel 88. Thus when the switch 50 is in activated position 74, the second output channel 88 is active.

An important feature of this design is the operating space of less than 50 μm between the input and output light channels. In both embodiments 10, 50, it is preferred that there is minimal free space on the top of the wafer 12 between the main body 13 and the shaft 18. Minimal space permits the switching element 10, 50 to be close to the source 84 and the outputs 86, 88 thus permitting the overall device to be small in size. In the communication arena, this concept reduces signal loss when the direction is altered or a connection is made. The idea of fabricating a shaft 18 from the base material 12 has many benefits like accurate, repeatable positioning of the shaft 18 in relationship to a source 84 and outputs 86, 88. Another advantage is having sufficient mass for maintaining a rigid and stable structure through the entire range of motion, as well as, holding its shape and supporting any structure attached or fabricated on to the platform 20. It will also dampen vibrations during the movement and while stopping or at rest. The result is a device with a fast settling time. By fabricating the shaft 18 from the wafer material 12 and locking it into position until final assembly, this ensures a stable, reliable and repeatable process of moving the shaft 18 from its original (home) position 72 to one or more activated locations 74 and back again.

It is to be understood that the present invention is not limited to having only a first output channel 86 and a second output channel 88. In the current example, it may be possible to have multiple output channels into which the mirror 90 directs the signal by its angular position. It should also be understood that the home position 72 and activated position 74 could be reversed so that, for instance, the mirror 90 could be located out of the beam path in home position 72 making the second output channel 88 active. The activator 30 may then push the mirror 90 upwards into the beam path 92 to make the first output channel 86 active when the switch 50 is in activated position 74. The activator 30 could also act to push or pull the directing component 76 from side to side rather than up and down, or could rotate the directing component, etc. The preceding examples are not to be construed as limitations, and many other variations are possible that would be obvious to one skilled in the art.

Listed below are other directing components 76 and optical systems 100 that can be implemented in conjunction with the switches 10, 50.

1) Free Space Optical Switch using a mirror or prism. The movements of the platform is to position the mirror or prism to re-direct optical lightwaves to a different path. The movement of the switch can be either vertical or horizontal. Applications for this switch include:
    A) OXC or space-division switches that operate on the basis of the spatial location of the input and output.

Benefits are low insertion loss, operate at high bit rates and if integrated with (SLA) semiconductor laser amplifier a net gain can be achieved. This device can be either intrinsic or extrinsic to the platform.

B) Matrix switch (router) where there are several inputs and outputs channels. This device can be either intrinsic or extrinsic to the platform.

C) Miscellaneous applications lightwave projection, shift and shuffle (see FIGS. 18–21 for various devices positioned on the platform.)

D) Diffractive optical elements, including gratings and polarizers.

Figure 18:
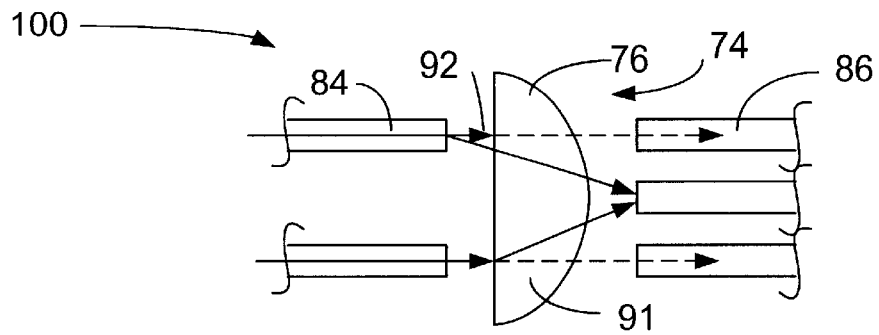
FIG. 18 illustrates a top plan view of an optical system using a lens in conjunction with the micro-switch of the present invention.

FIG. 18 shows a top plan view of an optical directing component 76 in an active position 74 where the beam paths of are depicted by solid arrows and the home position alternative paths shown in dashed lines. Beams 92 pass from input sources 84 to output channels 86. The directing component 76, which in this case is a lens 91, bends the light beams 92 to alter their paths.

Figure 19:
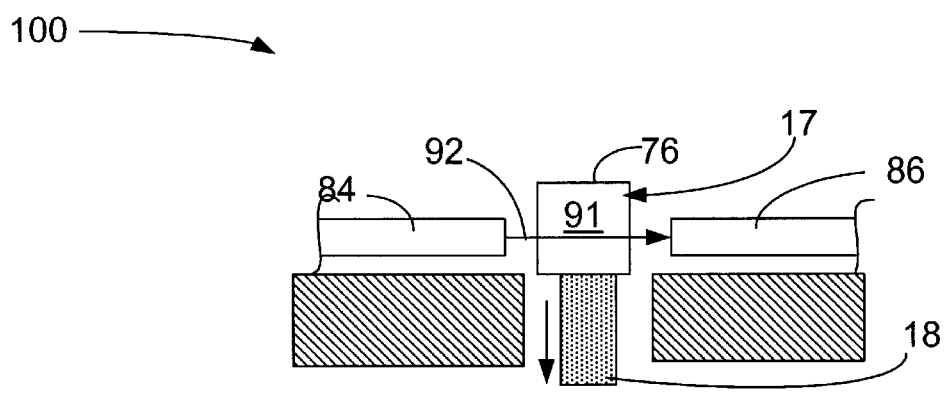
FIG. 19 shows a side view of an optical system using a lens in conjunction with the micro-switch of the present invention.

FIG. 19 shows a side view of the same optical directing component 76, and input channels 84 and output channels 86 as well as an arrow indicating the direction of movement for the directing component 76 as it moves from activated position 74 to home position. The lens shape 91 shown is one which has a uniform profile at any horizontal cross-section taken through it. This lens 91 is an example of the type of directing component that can be fabricated by masking the top surface of the wafer material 12 and etching straight downward, so that the directing component 76 is integrally fashioned with the shaft 18 as part of the movable switching element 17

Figure 20:
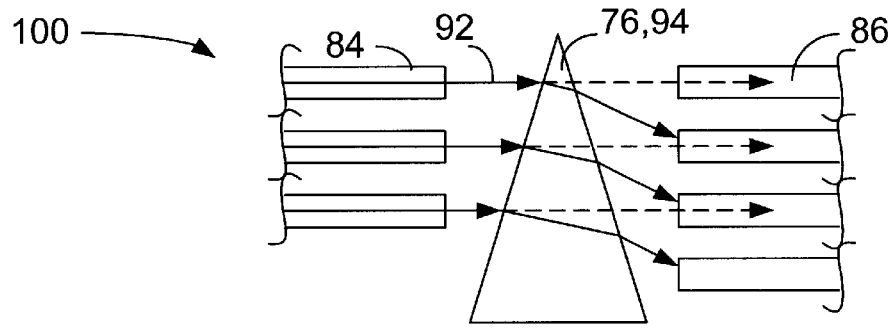
FIG. 20 shows a top view of an optical system using a prism in conjunction with the micro-switch of the present invention.

FIG. 20 shows a top view of another optical directing component 76, in the shape of a prism 94, and input channels 84 and output channels 86. The beam paths 92 for the active position 74 are depicted by solid arrows and the home position 72 alternative paths shown in dashed lines for beams.

Figure 21:
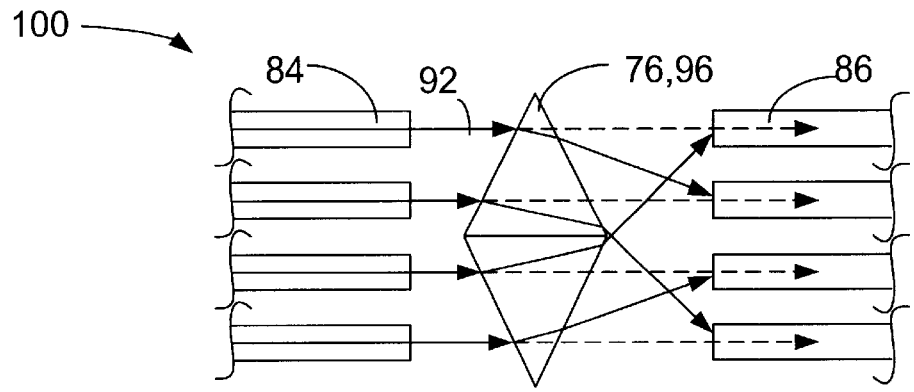
FIG. 21 illustrates a top view of an optical system using a double prism in conjunction with the micro-switch of the present invention.

FIG. 21 shows a top view of another optical directing component 76, in a diamond 96 or double prism shape, and input channels 84 and output channels 86. Once again, the beam paths 92 for the active position 74 are depicted by solid arrows and the home position 72 alternative paths shown in dashed lines for beams.

Figure 22:
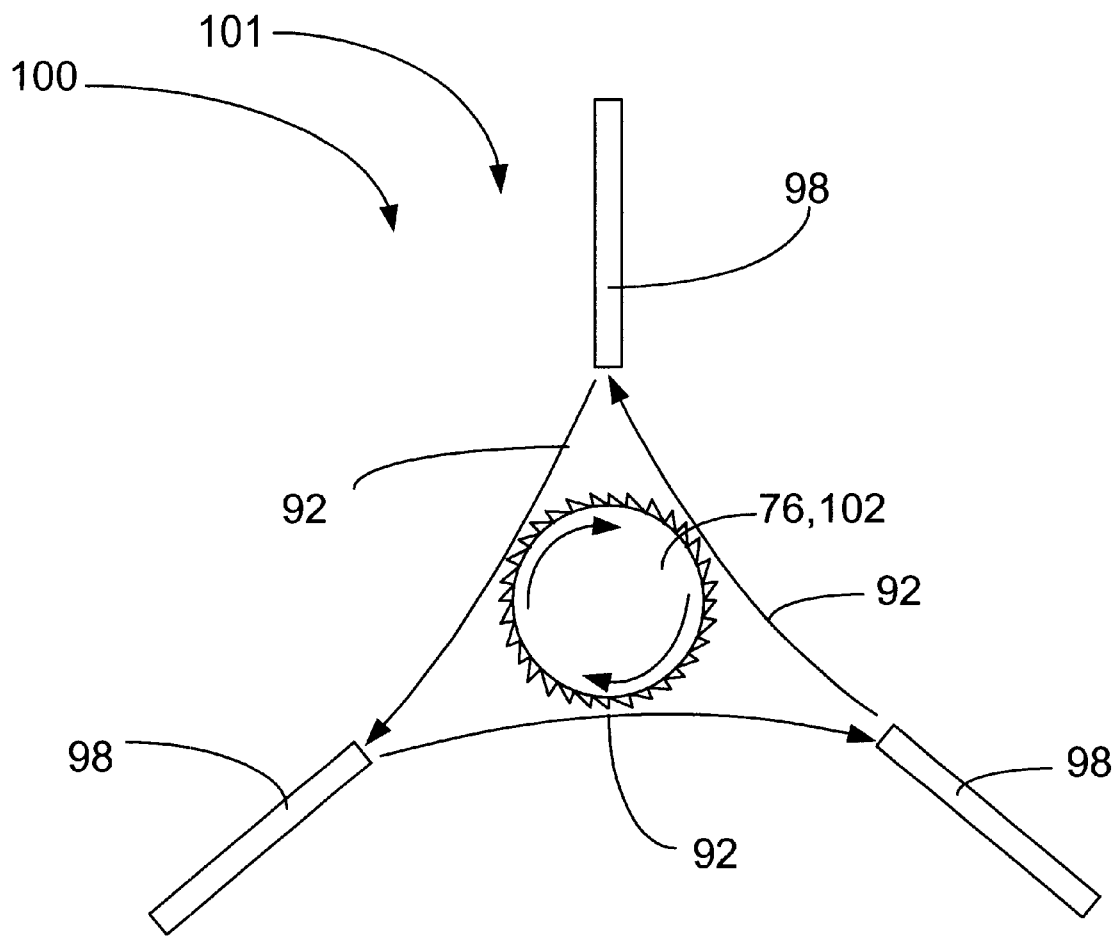
FIG. 22 shows a top view of an optical circulator using a grating reflector in conjunction with the micro-switch of the present invention.

2) Optical Circulator directs the signal sequentially from one port 98 to the next (see FIG. 22). The advantage of an optical circulator is its low insertion loss. It is made up of grating reflectors 102, FIG. 22 or a rotating prism 104, FIG. 23, which it is to be understood, can be used in place of the grating reflector 102 of FIG. 22.

FIG. 22 shows an optical circulator 101 having three ports 98 and an optical directing component 76 which is a grating reflector 102, which is used to redirect light beams 92 as it rotates.

Figure 23:
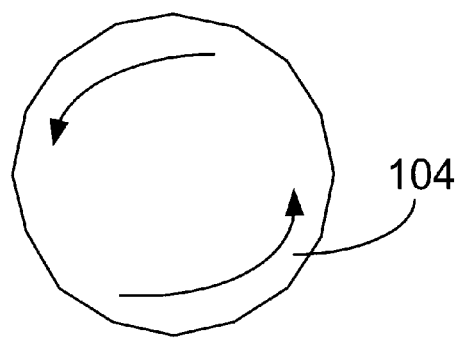
FIG. 23 illustrates a top view of a rotating prism which can be used in the optical circulator of FIG. 22.

FIG. 23 shows a rotating prism 104 which can be substituted for the grating reflector 102 in the optical circulator 101.

3) Gratings used for reflecting incident light. In each example the angle of diffraction can be changed, moved in and out of optical path or changed to a different period grating. Application includes spectrum analyzer and filter.

A) Multiplexer/Demultiplexer (see FIG. 24); used in WDM networks for add/drop channels.

Figure 25:
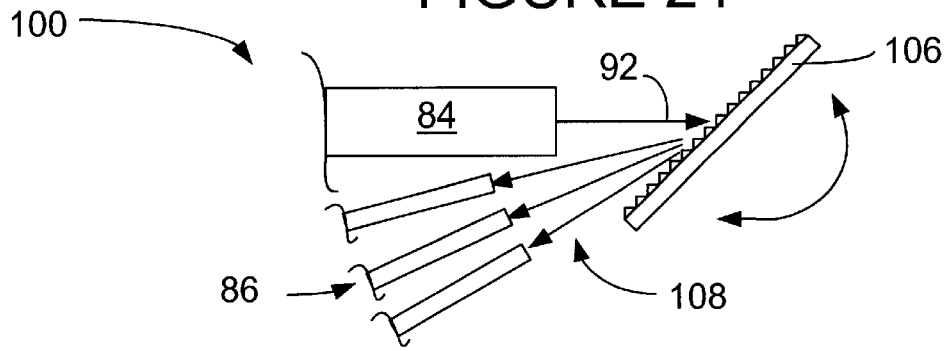
FIG. 25 shows a top view of an optical system using a grating in conjunction with the micro-switch of the present invention.

B) Blazed reflection, can be used as a switch (see FIG. 25).

Figure 26:
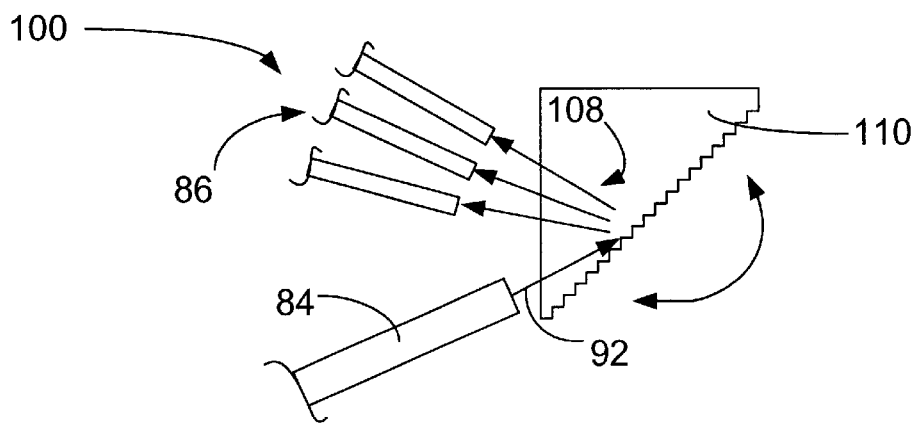
FIG. 26 illustrates a top view of an optical system using a Littrow grating in conjunction with the micro-switch of the present invention.

C) Littrow grating (Demultiplexer, see FIG. 26).

Figure 24:
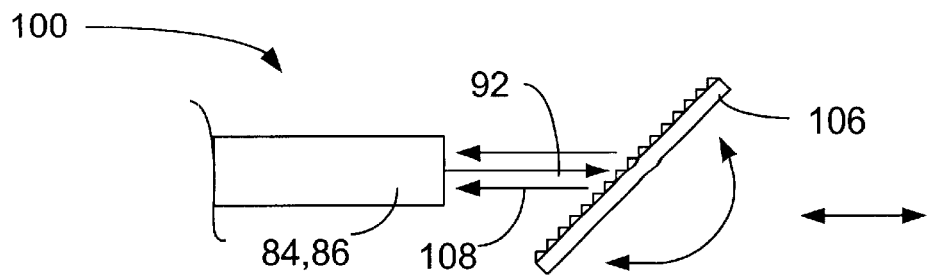
FIG. 24 shows a top view of an optical system using a grating in conjunction with the micro-switch of the present invention.

FIG. 24 shows an optical system 100 having an input channel 84 which also serves as an output channel 86. A grating 106 is used to reflect all or a portion of the incoming light beam 92 as a reflected beam 108. As the grating 106 is rotated or moved towards or away from the input channel 84, the reflected beam 108 can be varied.

FIG. 25 shows an optical system 100 having an input channel 84 and a number of output channels 86 which can be selectively accessed when grating 106 is rotated to vary the content or direction of the reflected beam 108.

FIG. 26 shows a similar optical system 100 using a Littrow grating 110.

4) Variable attenuator, using a step platform having a number of steps, with variations in the thickness of the steps will attenuate the signal differently. By moving the steps structure up, down or out of the signal path, the signal character is affected. (see FIG. 27).

Figure 27:
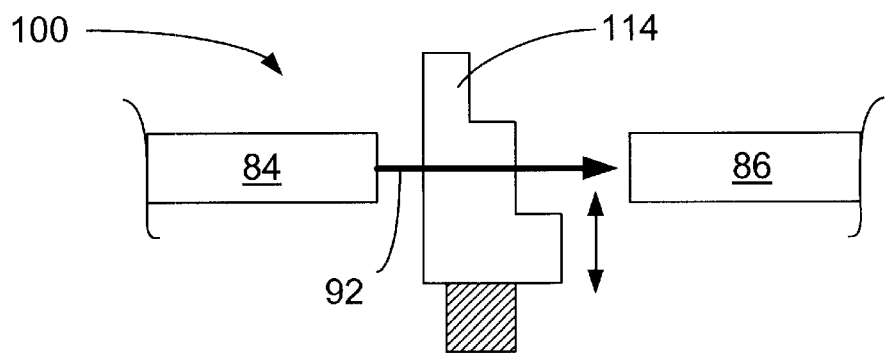
FIG. 27 shows a top view of an optical system using a movable attenuator in conjunction with the micro-switch of the present invention.

FIG. 27 shows an optical system 100 which uses a moveable attenuator 114 to vary the quality of a light beam 92 as it passes from the output channel 84 to the input channel 86.

5) Free Space Splitters/Combiners and Couplers are used for add/drop channel. This device can switch from a splitter to combiner and back by changing the path options. The application is for directing light beams to their appropriate destination in communication systems.

A) Beam Splitters (see FIGS. 29–32).

Figure 33:
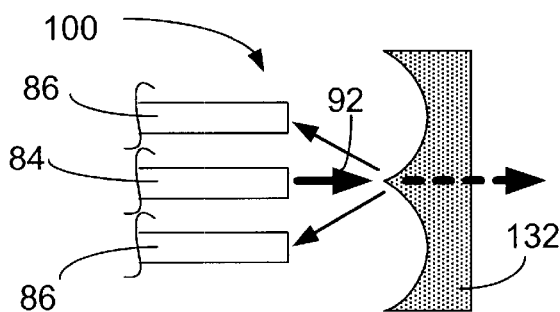
FIG. 33 illustrates a top view of an optical system using a wavefront dividing coupler in conjunction with the micro-switch of the present invention.

B) Wavefront Dividing Coupler can be either tunable or on/off device (see FIG. 33).

Figure 34:
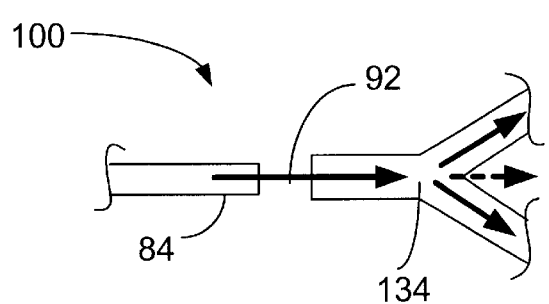
FIG. 34 shows a top view of an optical system using a Y divider coupler in conjunction with the micro-switch of the present invention.

C) "Y" Coupler (see FIG. 34).

Figure 28:
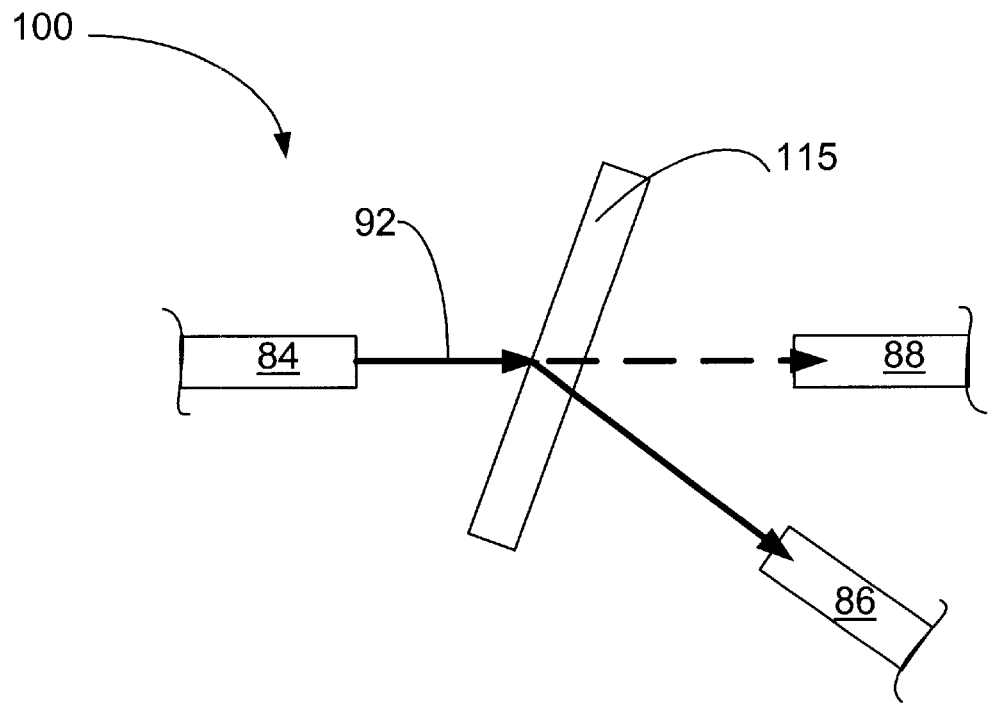
FIG. 28 illustrates a top view of an optical system using a parallel plate in conjunction with the micro-switch of the present invention.

FIG. 28 shows a parallel plate 115, which splits a beam 92 and diverts the split beams into two output channels 86. The undeflected beam travels a path marked in dashed line to second output channel 88 when the switch is deactivated.

Figure 29:
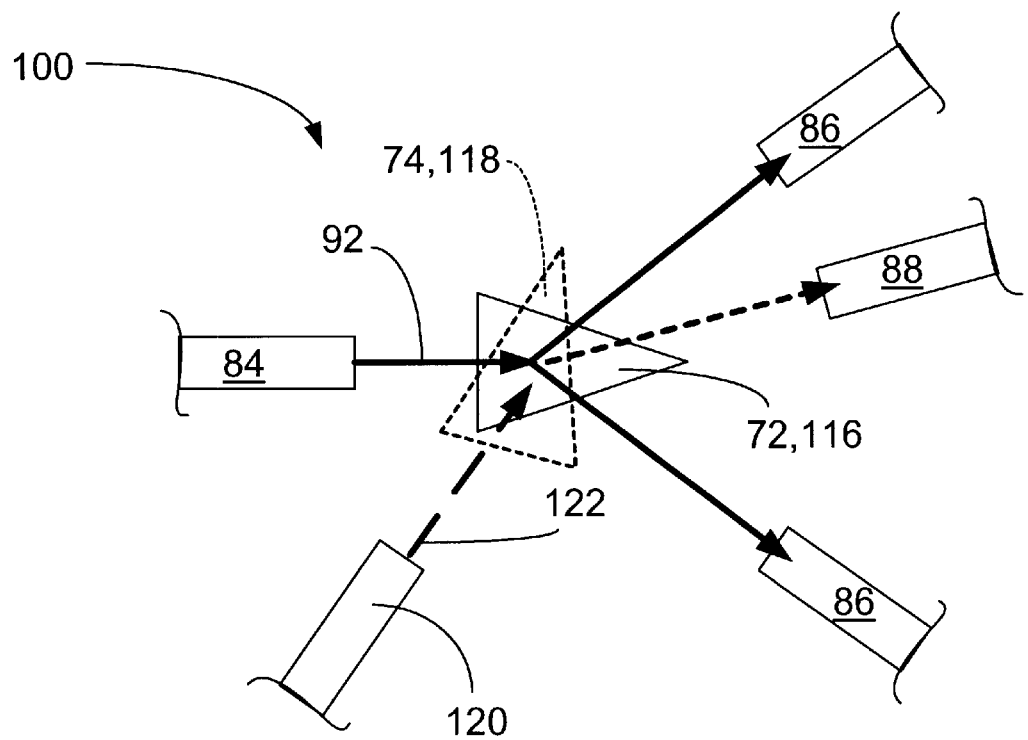
FIG. 29 shows a top view of an optical system using a beam splitter which can also be used as a beam combiner in conjunction with the micro-switch of the present invention.

FIG. 29 shows a beam splitter 116 which can also act as a beam combiner 118 when in the position shown in dashed lines. When in home position 72, the beam 92 from first input channel 84 is split into first output channels 86. When in activated position 74, a second beam 122 from second input channel 120 is combined with first beam 92 and directed into the second output channel 88.

Figure 30A:
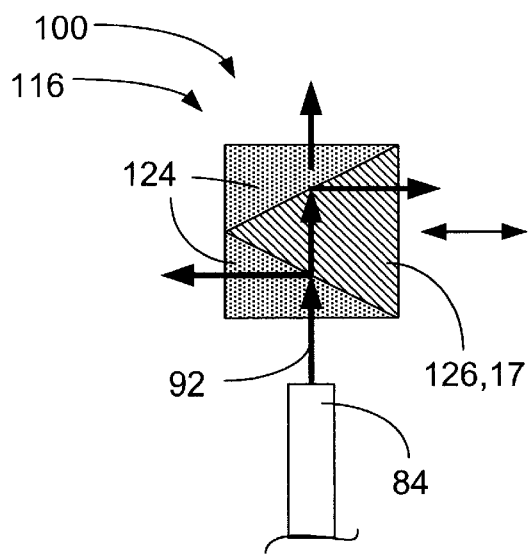
FIG. 30A illustrates a top view of an optical system using a beam splitter in conjunction with the micro-switch of the present invention, with the moveable portion in contact with the fixed portion.
Figure 30B:
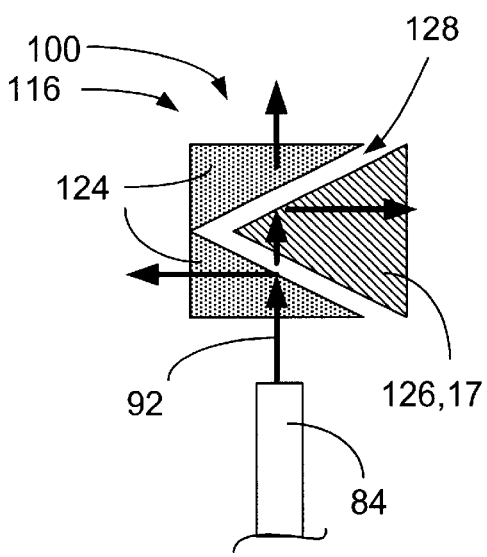
FIG. 30B shows a top view of an optical system using a beam splitter in conjunction with the micro-switch of the present invention, with the moveable portion separated from the fixed portion to create an air gap.

FIGS. 30A and B show a beam splitter 116 having a stationary portion 124 and a movable portion 126 as part of a movable switching element 17. In FIG. 30B, the movable portion 126 has been activated, thus creating an air gap 128 which, having a different index of refraction from the beam splitter 116 material, causes the light beam 92 to alter its character from that of the beam which does not pass through the air gap 128.

Figure 31:
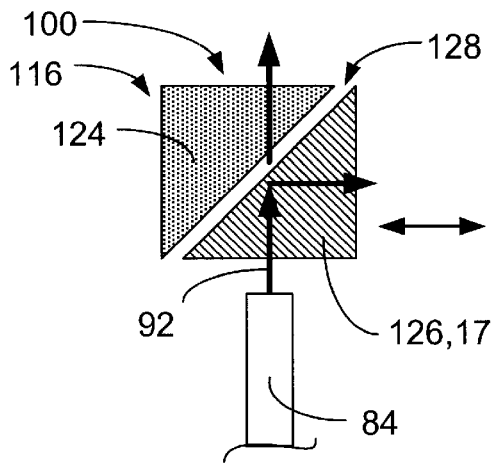
FIG. 31 illustrates a top view of an optical system using a beam splitter in conjunction with the micro-switch of the present invention.

FIG. 31 shows another beam splitter 116 having a stationary portion 124 and a movable portion 126, which again produces an air gap 128 which affects the quality of a light beam 92 from input channel 84.

Figure 32:
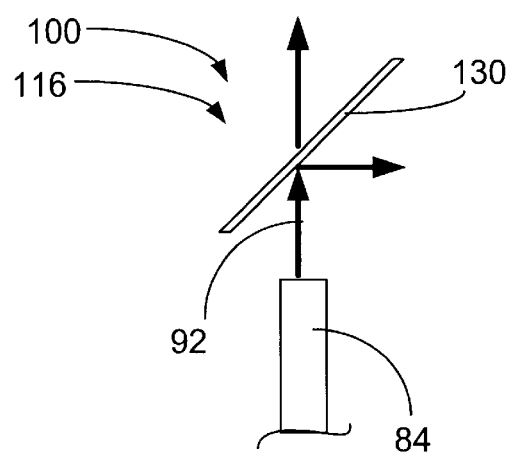
FIG. 32 shows a top view of an optical system using a beam splitter in conjunction with the micro-switch of the present invention.

FIG. 32 shows a very simple beam splitter 116, which can be a membrane 130 of partially reflecting material which diverts a portion of the light beam 92 when engaged.

FIG. 33 illustrates a wavefront dividing coupler 132, which divides the incoming beam 92 from input channel 84 into two beams, which are reflected into output channels 86. The dashed line shows the undeflected path of the beam when the coupler 132 is not engaged.

FIG. 34 shows a Y divider coupler 134, which divides the input beam 92 from input channel 84. The dashed line shows the undeflected path of the beam when the Y coupler 134 is not engaged.

6) Coupled Micro Ring Resonator can be used as a channel add/drop filter, in an interferometer. Key feature is that it can be an on/off device by rotating the resonator into position or in a vertical direction (see FIGS. 35–37B). The micro ring resonator can be coupled in series to reduce passband width. Some applications for this technology include sensing rotation (gyroscope) and acceleration. At this time it would be more practical to have the actuation as an extrinsic device.

Figure 35:
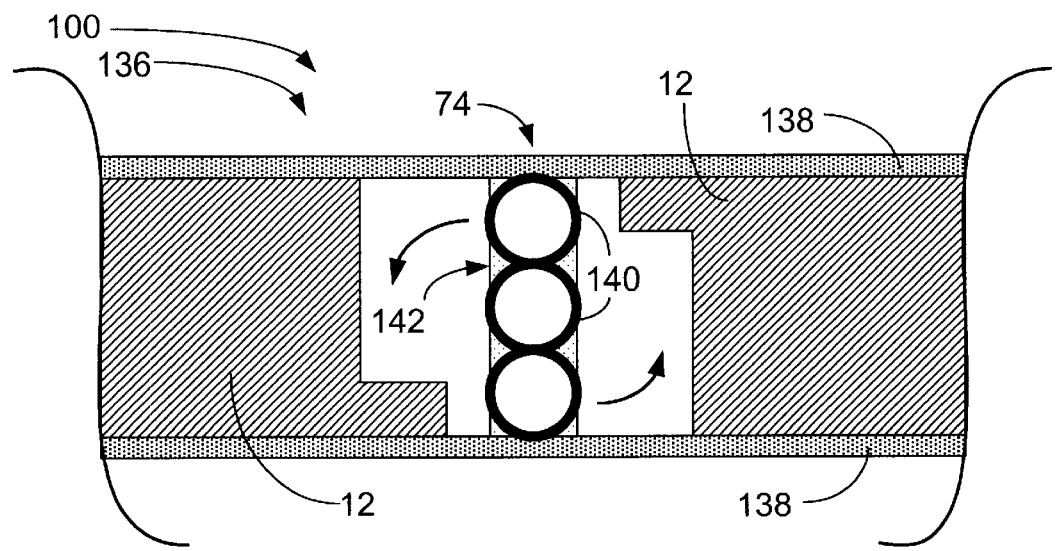
FIG. 35 illustrates a top view of an optical system using a micro-ring resonator in conjunction with the micro-switch of the present invention.

FIG. 35 illustrates a micro-ring resonator switch 136 having two waveguides 138 attached to a wafer substrate 12. A series of micro-rings 140 act as a kind of bridge which channels light between the waveguides 138, when the micro-rings are in contact with the waveguides 138. The micro-ring bridge 142 is pivotally mounted and is fabricated as described previously for the switches 10, 50 with a secondary membrane or a primary membrane at least during the construction stage of the switch. The micro-ring bridge 142 can pivot from an activated position 74 in which it contacts both waveguides 138, to a home position (not shown, but assumed by rotation in the direction of the arrows), in which contact is broken and no light is channeled between the waveguides 138.

Figure 36A:
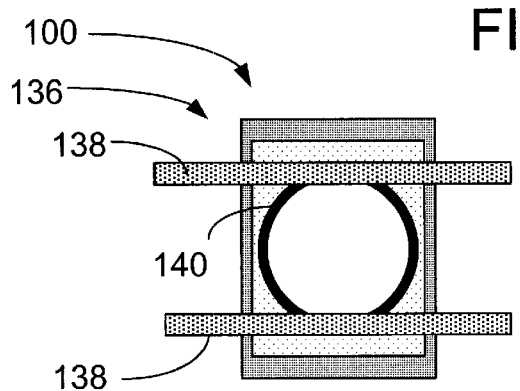
FIG. 36A shows a top view of an optical system using a micro-ring resonator in conjunction with the micro-switch of the present invention.
Figure 36B:
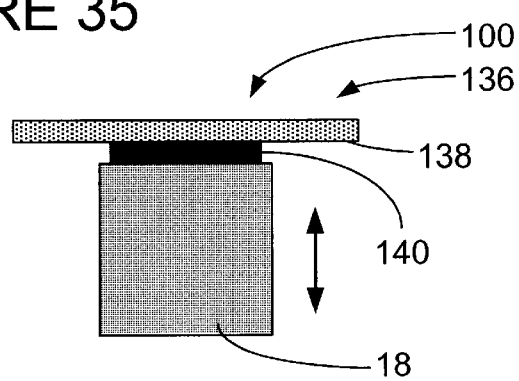
FIG. 36B illustrates a side view of an optical system using a micro-ring resonator in conjunction with the micro-switch of the present invention.

FIGS. 36A and B show top and side views of a micro-ring resonator switch 136 which uses a single micro-ring 140 which contacts the waveguides 138 from the underside, when the shaft 18 is driven upwards by the actuator (not shown).

Figure 37A:
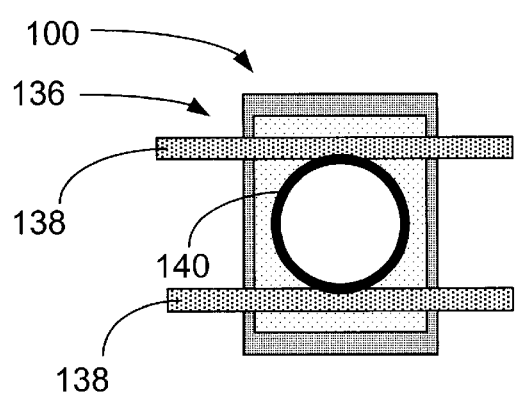
FIG. 37A shows a top view of an optical system using a micro-ring resonator in conjunction with the micro-switch of the present invention.
Figure 37B:
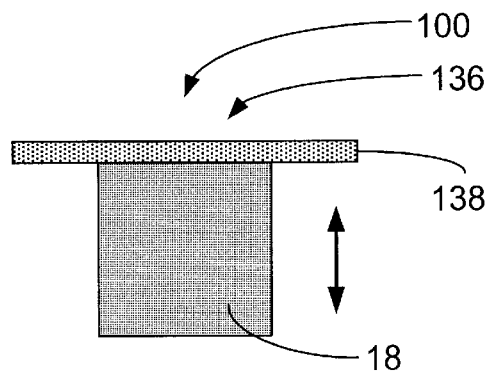
FIG. 37B illustrates a side view of an optical system using a micro-ring resonator in conjunction with the micro-switch of the present invention.

FIGS. 37A and B illustrates top and side views of a micro-ring resonator switch 136 which uses a single micro-ring 140 which contacts the waveguides 138 from between the waveguides 138, when the shaft 18 is driven upwards by the actuator (not shown).

7) Interferometers. Key features are moving elements like phase change elements, mirrors and detectors.
   A) Mach Zehnder used as an add/drop signal, a wavelength-flattened (mode conversion) and phase shift modulator. By moving the mirrors, or phase shift changing elements in and out of the optical path, the desired coupling ratio can be achieved. Also by combining a Bragg Grating with a Mach-Zehnder a Narrow-Band tap-and-combiner can be fabricated. A Mach Zehnder filter can be used as a gain-flattening filter.
   B) Michelson Interferometer is used for optical waveguide dispersion compensation, as a narrow-band transmission filter as a band-/high-/low-pass filter (configured with a Bragg Grating and 3 db coupler).
   C) Sagnac
   D) Littman monochromator As referred to above, some components such as collimators, polarizers, gratings, filters, resonators and diffractive optical elements actually alter the character of the signal, rather than actually directing it, however, for the purpose of this application, the term "directing component 76" has been used to include these components as well. It will be obvious to one skilled in the art that many other components not listed here may also be included, either as off-the-shelf additions which can be placed on the platforms, or fabricated as integral parts of the switch.

Figure 38:
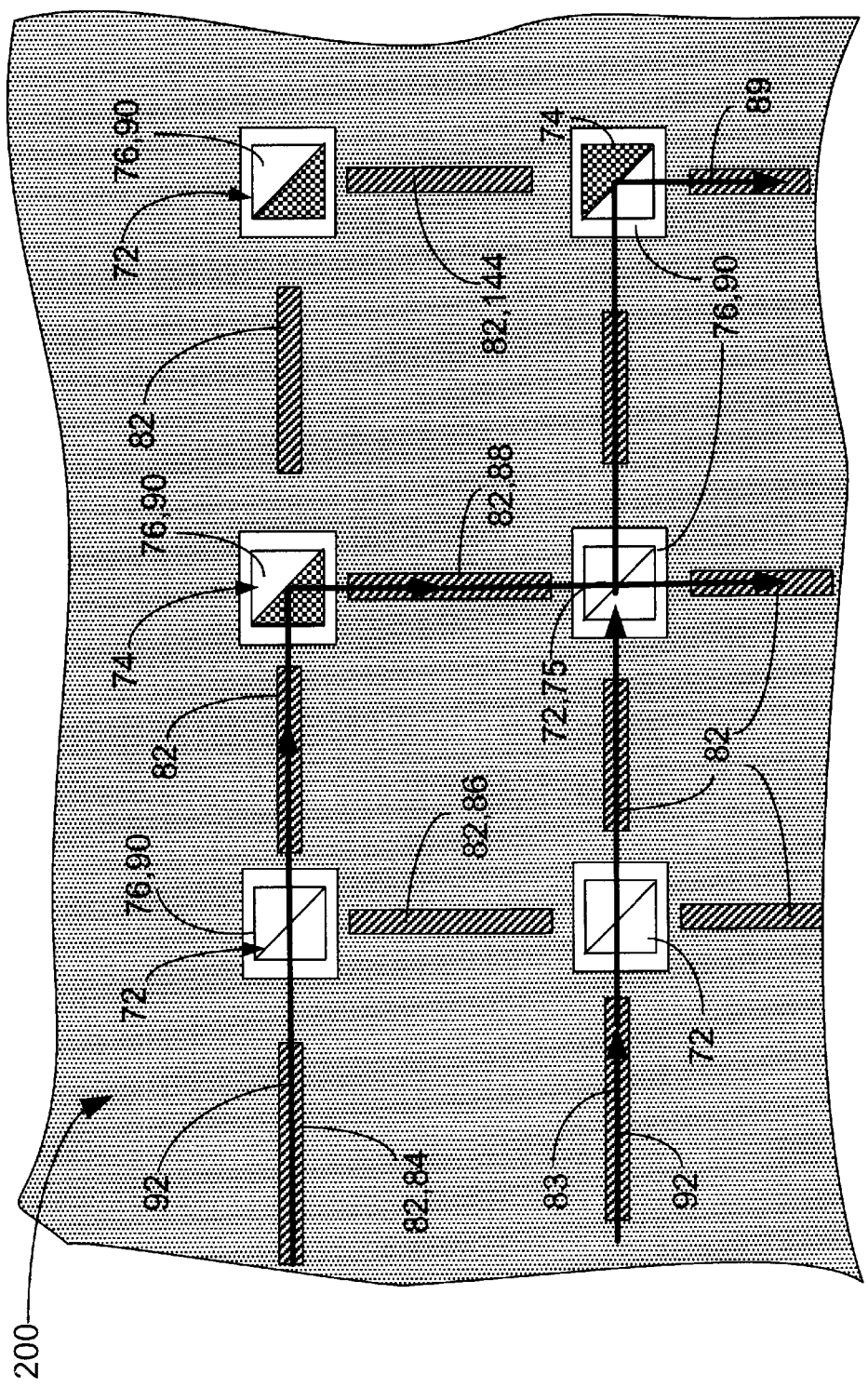
FIG. 38 shows an array of optical switches.

Although the emphasis in the previous discussion has been on the variety of individual components which are usable as switching elements, it should be understood that these micro-switches will find their most common application in arrays of switches, in which multiple devices are included on a single wafer through a common fabrication process. FIG. 38 shows one such array 200 in which six directing components 76, in this case, mirrors 90, are shown. A channeling device 82, acting as an input source 84, channels an input light beam 92 into a first directing component 76, which is in its home position 72, assumed to be out of the beam path. The first output channel 86 thus never receives the beam and is thus inactive. The beam 92 is allowed to pass through a second channeling device 82 to a second directing component 76, which is in its activated position 74. The beam is deflected into the second output channel 88, which is thus active. A third directing component 76 is also shown in its activated position 74. The third output channel 144 is nevertheless inactive since the beam has been previously diverted into the second output channel 88.

A second input beam 92 is shown entering lower input channeling device 83 and is passed by inactive devices 72 to reach active device 74, where it is reflected into output channel 89, it should be noted that the first and second input beams 92 cross at inactive device 75 without interfering with each other. Thus it is contemplated that multiple signals 92 may be channeled and switched within a single array 200 without interference.

It will be obvious to one skilled in the art that many variations in arrays and channel logic are possible. The number of channels is of course not limited to six, but many include hundreds or even thousands of directing components which are configured into arrays. It is preferred that the arrays include both rows and columns of directing components included in the array, so that, for instance, the beam directed into output channel 2 in FIG. 38, is then directed by the components in the second row of components into other channeling devices 82 fabricated on the same wafer. The components also are not limited to being all of one type, so that there may be a mixture of mirrors, beam splitters, etc. all included together on one wafer.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

This Correspondence Chart is for Ease of Understanding and Informational Purposes Only, and Does not form a part of the formal patent application.

10 switch
12 wafer substrate
13 main body
14 top surface
16 top-surface groove
17 movable switching element
18 shaft
20 platform
22 bottom surface
24 bottom-surface groove
26 primary membrane
28 shank
30 actuator
32 temporary membrane
50 second embodiment
52 secondary membrane
60 mask layer
62 second wafer layer
64 mask open areas
66 etch stop layer
68 base
70 actuator attachment point 72 home position
74 activated position
75 inactive device
76 directing component
78 magnetic material layer
80 electromagnet
82 channeling device
83 lower channeling device
84 input source
86 first output channel
88 second output channel
89 third output channel
90 mirror
91 lens
92 input light beam
94 prism
96 diamond shape prism
98 port
100 optical system
102 grating reflector
104 rotating prism
106 grating
108 reflected beam
110 Littrow grating
112 fixed attenuator
114 movable attenuator
115 parallel plate
116 beam splitter
118 beam combiner
120 second input channel
122 second input beam
124 stationary portion
126 movable portion
128 air gap
130 membrane
132 wavefront dividing coupler
134 Y divider coupler
136 micro-ring resonator switch
138 waveguide
140 micro-ring
142 micro-ring bridge
144 third output channel
200 array While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A microstructure switch comprising:
a main body;
a moveable switching element;
at least one membrane which connects said moveable switching element to said main body; and
an actuator which moves said moveable switching element from a first position to a second position, where said at least one membrane is a primary temporary membrane which is released after said actuator is attached.

2. A microstructure switch as in claim 1, wherein:
said at least one membrane also includes a secondary membrane.

3. A microstructure switch as in claim 1, wherein:
said actuator is integrally formed with said secondary membrane.

4. A microstructure switch as in claim 2, wherein:
said actuator is integrally formed with said secondary membrane.

5. A microstructure switch as in claim 1, wherein:
said actuator is formed independently of said at least one membrane.

6. A microstructure switch as in claim 1, wherein:
said moveable switching element is formed from a portion of said main body.

7. A microstructure switch as in claim 6, wherein:
said moveable switching element is formed from said portion of said main body by a process chosen from the group consisting of chemical etching, ion etching, laser etching and mechanical micro-machining.

8. A microstructure switch as in claim 1, wherein:
said actuator is a mechanism chosen from the group consisting of piezoelectric devices, screw shafts, electrostatic, electromagnetic, hydraulic and rotary type actuators.

9. A microstructure switch as in claim 1, wherein:
said moveable switching element includes a directing component.

10. A microstructure switch as in claim 9, wherein:
said directing component is chosen from a group consisting of free space optical switches, free space splitters, combiners, couplers, beam splitters, wavefront dividing couplers "Y" couplers, optical circulators, gratings, diode lasers, mirrors, prisms, lens, electrodes, contact points, detectors, collimators, polarizers, filters, resonators and diffractive optical elements.

11. A microstructure switch as in claim 9, wherein:
said directing component is formed integrally with said moveable switching element.

12. A microstructure switch as in claim 9, wherein:
said directing component is independently formed and mounted onto said moveable switching element.

13. A microstructure switch as in claim 1, wherein:
said primary membrane is formed by etching from both a top surface and bottom surface of said main body, and said etching is halted by an etch stop, so that said primary membrane is formed.

14. A microstructure switch as in claim 1, wherein:
said at least one membrane also includes a secondary membrane which remains in position after said temporary membrane is released.

15. A microstructure switch prepared by the process comprising the steps of:
A) providing a substrate main body; and
B) forming a groove surrounding a shaft, said groove not extending to completely separate said shaft from said substrate material, so that a membrane of material remains which connects said shaft to said substrate main body.

16. A microstructure switch as in claim 15, wherein process step B) includes:
1) forming an upper groove from the top surface of said substrate main body;
2) forming a lower groove from the bottom surface of said substrate main body; and
3) using a stop device to limit the depth of forming of said upper groove and said lower groove to leave a primary membrane.

17. A microstructure switch as in claim 15, further comprising:

C) providing a switching element connected to said shaft.

18. A microstructure switch as in claim 17, wherein said switching element is integrally formed from said shaft.

19. A microstructure switch as in claim 17, further comprising:
D) providing an actuator connected to said shaft, said actuator producing movement between a first position and a second position.

20. A microstructure switch as in claim 15, further comprising:
D) attaching a secondary membrane to said shaft.

21. A microstructure switch as in claim 19, wherein said actuator is integrally formed with a secondary membrane, which is attached to said shaft.

22. A microstructure switch as in claim 19, further comprising:
E) releasing said primary membrane, to leave said shaft free-standing.

23. A microstructure switch as in claim 21, further comprising:
E) releasing said primary membrane, leaving said shaft attached to said secondary membrane.

24. A microstructure switch as in claim 21, further comprising:
E) releasing said primary membrane, leaving said shaft attached to said secondary membrane which includes an integrally formed actuator.

25. A method for manufacturing microstructure switches comprising the steps of:
A) providing a substrate main body; and
B) forming an groove surrounding a shaft, said groove not extending to completely separate said shaft from said substrate material, so that a membrane of material connects said shaft to said substrate main body.

26. A method for manufacturing microstructure switches as in claim 25, wherein step B) includes:
1) forming an upper groove from the top surface of said substrate main body;
2) forming a lower groove from the bottom surface of said substrate main body; and
3) using a stop device to limit the depth of forming of said upper groove and said lower groove to leave a primary membrane.

27. A method for manufacturing microstructure switches as in claim 25, further comprising:
C) providing a switching element connected to said shaft.

28. A method for manufacturing micro-switches as in claim 27, wherein said switching element is integrally formed from said shaft.

29. A method for manufacturing microstructure switches as in claim 27, further comprising:
D) providing an actuator connected to said shaft, said actuator producing movement between a first position and a second position.

30. A method for manufacturing microstructure switches as in claim further comprising:
D) attaching a secondary membrane to said shaft.

31. A method for manufacturing microstructure switches as in claim 29, wherein said actuator is integrally formed with a secondary membrane, which is attached to said shaft.

32. A method for manufacturing microstructure switches as in claim 29, further comprising:
E) releasing said primary membrane, to leave said shaft free-standing.

33. A method for manufacturing microstructure switches as in claim 30, further comprising:
E) releasing said primary membrane, leaving said shaft attached to said secondary membrane.

34. A method for manufacturing microstructure switches as in claim 31, further comprising:
E) releasing said primary membrane, leaving said shaft attached to said secondary membrane which includes an integrally formed actuator.

35. A system for switching signals from at least one input channel between a plurality of output channels, comprising:
at least one switch having a main body, a moveable switching element, at least one membrane which connects said moveable switching element to said main body, and an actuator which moves said moveable switching element from a first position to a second position;
at least one input channeling device which delivers at least one input signal to said switch;
at least one output channeling device which receives an output signal when said switch is not activated;
at least one alternate output channeling device which receives an output signal when said switch is activated;
said moveable switching element including a directing component which directs said input signal to said output channeling device or alternate channeling device.

36. A system for switching as in claim 35, wherein:
said at least one membrane includes a primary membrane.

37. A system for switching as in claim 35, wherein:
said at least one membrane includes a secondary membrane.

38. A system for switching as in claim 35, wherein:
said directing component is an optical component.

39. A system for switching as in claim 35, wherein:
said directing component is chosen from a group consisting of free space optical switches, free space splitters, combiners, couplers, beam splitters, wavefront dividing couplers, "Y" couplers, optical circulators, gratings, diode lasers mirrors, prisms, lens, electrodes, contact points, detectors, collimators, polarizers, filters, resonators and diffractive optical elements.

40. A system for switching as in claim 36, wherein:
said primary membrane is a temporary membrane.

41. A system for switching as in claim 36, wherein:
said at least one directing component is a plurality of directing components which are grouped into an array.

42. A system for switching as in claim 36, wherein:
said array is a two-dimensional array.

43. A switching array for switching signals from at least one input channel between a plurality of output channels, comprising:
a plurality of switches, each switch having a main body, a moveable switching element, at least one membrane which connects said moveable switching element to said main body, and an actuator which moves said moveable switching element from a first position to a second position;
at least one input channeling device which delivers at least one input signal to said switch array;
a plurality of output channeling devices which receives at least one output signal from said switch array;
each said moveable switching element including a directing component which directs said input signal to said output channeling device or alternate channeling device.

44. A switching array as in claim 43, wherein:
said at least one membrane includes a primary membrane.

45. A switching array as in claim 43, wherein:
said at least one membrane includes a secondary membrane.

46. A microstructure switch comprising:
a main body;
a moveable switching element;
at least one membrane which connects said moveable switching element to said main body, where said at least one membrane includes a secondary membrane;
an actuator which moves said moveable switching element from a first position to a second position.

47. A microstructure switch as in claim 46, wherein:
said at least one membrane also includes, a primary membrane.

48. A microstructure switch as in claim 46, wherein:
said at least one membrane includes an actuator.

49. A microstructure switch as in claim 48, wherein:
said actuator is integrally formed with said secondary membrane.

50. A microstructure switch as in claim 46, wherein:
said actuator is formed independently of said at least one membrane.

51. A microstructure switch as in claim 46, wherein:
said moveable switching element is formed from portion of said main body.

52. A microstructure switch as in claim 51, wherein:
said moveable switching element is formed from said portion of said main body by a process chosen from the group consisting of chemical etching, ion etching, laser etching and mechanical micro-machining.

53. A microstructure switch as in claim 46, wherein:
said actuator is a mechanism chosen from the group consisting of piezoelectric devices, screw shafts, electrostatic, electromagnetic, hydraulic and rotary type actuators.

54. A microstructure switch as in claim 46, wherein:
A said moveable switching element includes a directing component.

55. A microstructure switch as in claim 54, wherein:
said directing component is chosen from a group consisting of free space optical switches, free space splitters, combiners, couplers, beam splitters, wavefront dividing couplers "Y" couplers, optical circulators, gratings, diode lasers, mirrors, prisms, lens, electrodes, contact points, detectors, collimators, polarizers, filters, resonators and diffractive optical elements.

56. A microstructure switch as in claim 54, wherein:
said directing component is formed integrally with said moveable switching element.

57. A microstructure switch as in claim 54, wherein:
said directing component is independently formed and mounted onto said moveable switching element.

58. A microstructure switch as in claim 47, wherein:
said primary membrane is formed by etching from both a top surface and bottom surface of said main body, and said etching is halted by an etch stop, so that said primary membrane is formed.

59. A microstructure switch as in claim 47, wherein:
said primary membrane is a temporary membrane which is released after said actuator is attached.

60. A microstructure switch as in claim 59, wherein:
said secondary membrane remains in position after said temporary membrane is released.

61. A microstructure switch comprising:
a main body;
a moveable switching element;
at least one membrane which connects said moveable switching element to said main body; and
an actuator which moves said moveable switching element from a first position to a second position, where said moveable switching element is formed from a portion of said main body.

62. A microstructure switch as in claim 61, wherein:
said at least one membrane is a primary membrane.

63. A microstructure switch as in claim 61, wherein:
said at least one membrane is a secondary membrane.

64. A microstructure switch as in claim 61, wherein:
said at least one membrane includes an actuator.

65. A microstructure switch as in claim 63, wherein:
said actuator is integrally formed with said secondary membrane.

66. A microstructure switch as in claim 61, wherein:
said actuator is formed independently of at least one membrane.

67. A microstructure switch as in claim 61, wherein:
said moveable switching element is formed from said portion of said main body by a process chosen from the group consisting of chemical etching, ion etching, laser etching and mechanical micro-machining.

68. A microstructure switch as in claim 61, wherein:
said actuator is a mechanism chosen from the group consisting of piezoelectric devices, screw shafts, electrostatic, electromagnetic, hydraulic and rotary type actuators.

69. A microstructure switch as in claim 61, wherein:
said moveable switching element includes a directing component.

70. A microstructure switch as in claim 69, wherein:
said directing component is chosen from a group consisting of free space optical switches, free space splitters, combiners, couplers, beam splitters, wavefront dividing couplers "Y" couplers, optical circulators, gratings, diode lasers, mirrors, prisms, lens, electrodes, contact points, detectors, collimators, polarizers, filters, resonators and diffractive optical elements.

71. A microstructure switch as in claim 70, wherein:
said directing component is formed integrally with said moveable switching element.

72. A microstructure switch as in claim 70, wherein:
said directing component is independently formed and mounted onto said moveable switching element.

73. A microstructure switch as in claim 62, wherein:
said primary membrane is formed by etching from both a top surface and bottom surface of said main body, and said etching is halted by an etch stop, so that said primary membrane is formed.

74. A microstructure switch as in claim 62, wherein:
said primary membrane is a temporary membrane which is released after said actuator is attached.

75. A microstructure switch as in claim 74, wherein:
said at least one membrane also includes a secondary membrane which remains in position after said temporary membrane is released.

* * * * *